UNITED STATES PATENT OFFICE.

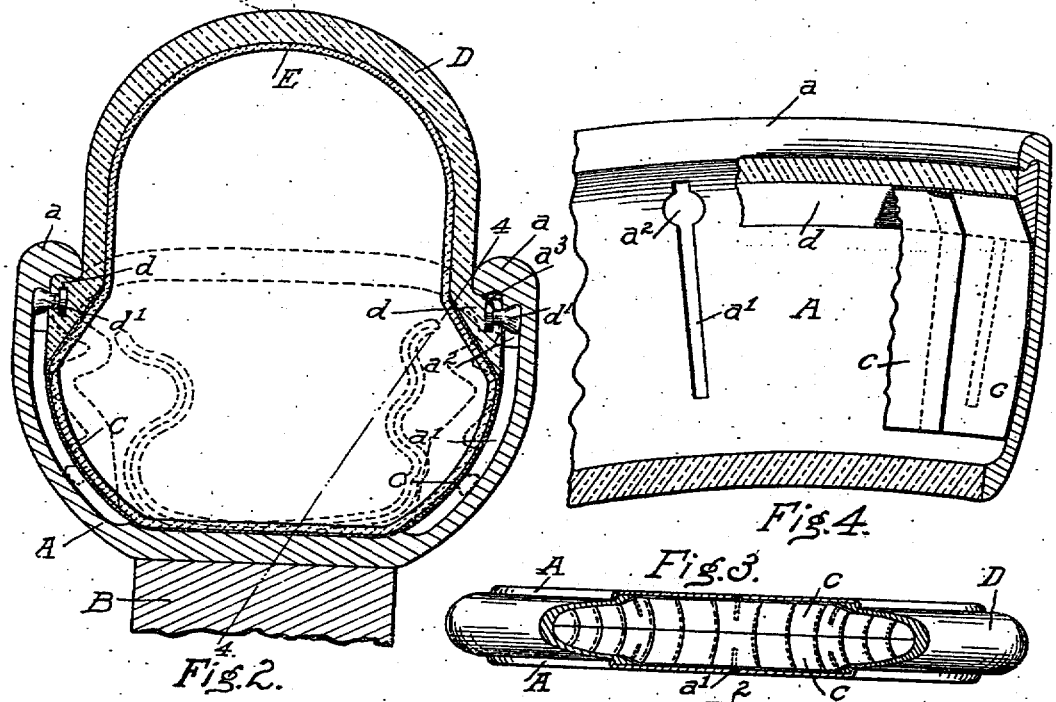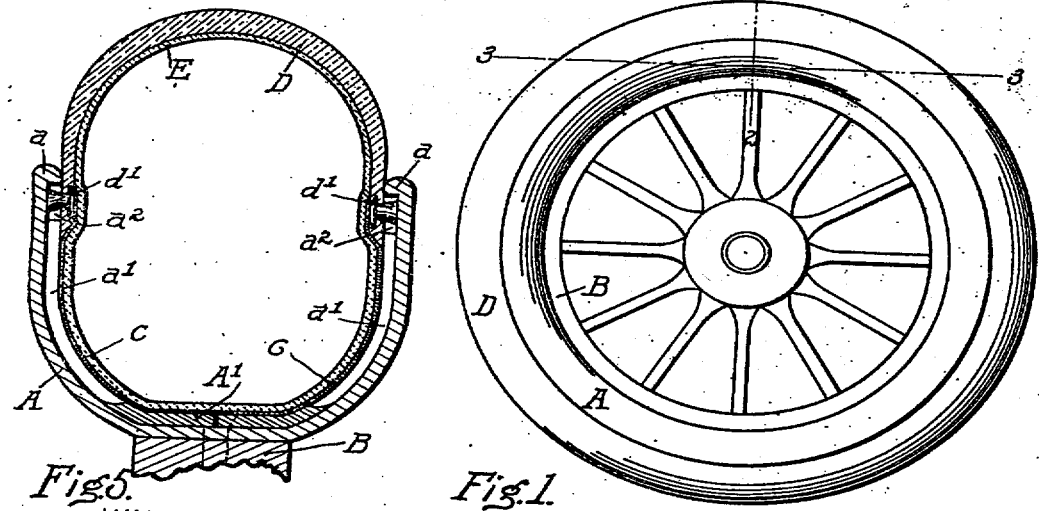

JOHN H. GREEN, OF SPRINGFIELD, ILLINOIS.

PNEUMATIC TIRE.

No. 855,884.

Specification of Letters Patent.

Patented June 4, 1907.

Application filed December 28, 1906. Serial No. 349,886.

*To all whom it may concern:*

Be it known that I, JOHN H. GREEN, a citizen of the United States, residing at Springfield, in the county of Sangamon and State of Illinois, have invented a certain new and useful Improvement in Pneumatic Tires, of which the following is such a full, clear, and exact description as will enable others skilled in the art to make and use my said invention.

This invention relates to pneumatic tires such as are used on automobiles or similar vehicles.

The purposes of this invention are to provide a pneumatic tire so constructed and arranged that upon the deflation of the tire that part of the outer casing which under ordinary conditions would be running upon the ground will lie within the rim of the wheel, and the wheel will run upon its rim and the rim will protect the outer casing and prevent the cutting of the outer casing; to provide means adapted to permit radial movement of the outer casing and also adapted to prevent creeping of the outer casing within the rim; and also adapted to prevent untimely disengagement of the outer casing from the rim; the tire being so constructed and arranged as to be easily detachable when desired but not accidentally detachable when in use under any ordinary conditions of use.

With these ends in view my invention consists in the novel features of construction shown in the annexed drawing, to which reference is hereby made, and hereinafter particularly described and finally recited in the claims.

Referring to the drawing in which similar reference letters and numerals designate like parts in the several views; Figure 1 is an elevation of a wheel equipped with a tire embodying my improvement. Fig. 2 is an enlarged transverse section on the line 2. 2. of Fig. 1. Fig. 3 is a horizontal transverse section on the line 3. 3. of Fig. 1, the inner tube being removed. Fig. 4 is an enlarged oblique section on the line 4. 4. of Fig. 2; and Fig. 5 is an enlarged transverse sectional view illustrating a modified construction of the tire.

The rim A is of metal and is secured to the felly in the usual manner. The rim has inwardly curved members $a$ forming internal circular channels or depressions $a^3$ in which the dove tail parts $d$ of the outer casing D fit; it also has transverse channels $a^1$ accommodating lugsite pins $d^1$ sliding in the channels; and openings $a^2$ through which the lugs $d^1$ may be placed in the channels. The lugs $d^1$ may be integral with the outer casing or may be made separately and secured on the outer casing. The lugs $d^1$ and the corresponding channels $a^1$ are preferably of dove tail cross section, that form of the lugs and the channels being most suitable to permit the lugs to traverse the channels and prevent untimely withdrawal of the lugs from the channels; but straight lugs and corresponding channels may be used without departure from my invention. The channels $a^1$ may be formed in the body of the rim A as shown in Fig. 2, or they may be formed in separate segmental plates $A^1$, situated within the trough of the rim substantially as shown in Fig. 5. The outer casing D is of vulcanized rubber or other suitable material and preferably has integral circular members $d$, substantially of the form shown, fitting in the channels or depressions $a^3$ respectively. The lugs or pins $d^1$ match the channels $a^1$ respectively.

A number of strips C of linen or other suitable material are preferably attached to the outer casing and overlap each other within the trough of the rim A, and serve as a protector to prevent injury to the inner tube. The protector may however, consist of a flexible circumferential unattached lining, of any suitable material, fitting within the trough of the rim and between the inner tube and the rim.

The inner tube E is of thin rubber of the usual construction and fits within the rim and within the outer casing and when inflated the pressure of the air within the inner tube holds the members $d$ of the outer casing D firmly in the channels or depressions $a^3$ of the rim A. The openings $a^2$ near the upper ends of the channels $a^2$ are so situated that while the outer casing is being inserted into the rim, the lugs $d^1$ will enter the openings $a^2$ and upon the members $d$ being pushed downward the lugs will travel downward in the channels $a^1$. The lugs $d^1$ serve to prevent creeping of the outer casing; and the lugs traveling in the channels $a^1$, guide the radial movement of the outer casing; and prevent crosswise movement of the outer casing.

The strips or lining C between the rim A and the inner tube E prevent the inner tube from entering the channels $a^1$ when the tire is inflated and when the tire is deflated the strips or lining C protect the tube E from injury by the moving outer casing D. When the outer casing moves radially inward within the rim the members $d$ of the casing strip the protector, or protectors, away from the inner wall of the trough of the rim, in advance of the moving pins $d^1$, so that the protector, or protectors, will not interfere with the movement of the pins $d^1$ in the channels $a^1$.

The rim A is of such dimensions that upon the deflation of the tire the members $d$ of the outer casing will freely slide radially within the rim and approach each other. The smallest diameter of the outer casing being greater than the smallest internal diameter of the rim, the members $d$ of the outer casing will, when the tire is deflated, slide radially within the rim and approach each other in the trough of the rim, and when that occurs, that part of the outer casing which is running upon the ground will enter and be housed in the trough of the rim and the wheel will run upon its rim, thereby protecting from injury the outer casing lying within the trough of the rim; and the wheel may be safely run in that way until the tire can be again inflated. The construction being as described, the outer casing cannot be injured by reason of the casing over-lapping the rim and the rim running on and cutting the casing.

In case it is desired to remove the outer casing it is only necessary to deflate the tire and press the sides of the outer casing transversely inward toward each other and then pull the adjacent part of the casing radially outward. The pressing inward of the sides of the outer casing will successively withdraw the lugs or pins $d^1$ from the openings $a^2$; whereupon by pulling on the part of the outer casing adjacent to the lugs which have been withdrawn from the openings $a^2$, the opposite part of the tire will be caused to move radially inward within the trough of the rim sufficiently to permit the insertion of the finger, or a suitable instrument, between the laterally compressed and retracted part of the outer casing and the edge of the rim, and by moving the finger, or instrument, along the inner edge of the rim and between the outer casing and the rim, and continuing to press inward that part of the outer casing adjacent to the lugs $d^1$ respectively, to remove the lugs in succession from the openings $a^2$, and continuing to use the finger, or the instrument, to prevent the lugs from re-entering the openings, the casing may be removed from the rim.

I have described the rim as having inwardly curved circular members $a$ forming internal channels or depressions. It is to be understood however that the members $a$ may be merely flat circular ledges or abutments against which the members $d$ of the outer casing abut; or the rim-members $a$ may be omitted, without departure from my invention. In case the rim-members $a$ are omitted, the members $d$ of the outer casing will also be omitted and the lugs $d^1$, stopping against the upper ends of the transverse channels $a^1$, will prevent radially outward displacement of the outer casing so long as the tire is inflated. This modified construction is clearly indicated in Fig. 5 of the drawings.

By reference to the drawings it will be seen that the relative dimensions of the parts are such that the major part of the air space of the tire is within the trough of the rim and the rim is adapted to completely house (as indicated by lines in Fig. 2) that part of the deflated tire running upon the ground and which would otherwise overlap the edges of the rim and be subject to injury by the rim.

Having fully described my invention what I claim as new and desire to secure by Letters Patent is:

1. In a tire the combination of a rim having a trough adapted to house the outer casing of a deflated tire, also having transverse channels; an outer casing slidable radially within the rim and having pins slidable in the transverse channels of the rim; an inflatable tube fitting within the outer casing and the trough of the rim: and a protector situated between the inflatable tube and the rim and movable by the radially moving outer casing to uncover the transverse channels of the rim in advance of the pins on the outer casing, and also adapted to exclude the inflatable tube from the channels in the rim.

2. In a tire, the combination of a rim adapted to house the outer casing of a deflated tire and having transverse dove-tail channels, an outer casing fitting within the rim, and dove-tail pins on the outer casing slidable in the channels of the rim.

3. In a tire, the combination of a rim having a trough with transverse channels and abutments; an outer casing movable radially within the trough of the rim and provided with stops fitting in the channels of the rim and engaging on the abutments to prevent outward radial displacement of the outer casing, also adapted to guide inward movement of the outer casing, also adapted to prevent creeping of the outer casing and also adapted to prevent crosswise movement of the outer casing within the trough of the rim; and an inflatable tube within the outer casing and the trough of the rim.

4. In a tire, a rim adapted to house the outer casing of a deflated tire and having transverse channels adapted to accommodate headed pins, also having enlarged openings near one end of said channels respectively; in combination with an outer casing fitting within the rim and provided with headed pins adapted to enter the enlarged openings and slidable in the transverse channels of the rim.

In witness whereof I have hereunto signed my name at Springfield Illinois this 19th day of December, 1906.

JOHN H. GREEN.

Witnesses:
O. A. MERKEL,
W. J. AURELEUS.

---

Correction in Letters Patent No. 855,884.

It is hereby certified that in Letters Patent No. 855,884, granted June 4, 1907, upon the application of John H. Green, of Springfield, Illinois, for an improvement in "Pneumatic Tires," an error appears in the printed specification requiring correction, as follows: "In line 97, page 1, the reference letter "$a^3$" should be $a^1$; and that the said Letters Patent should be read with this correction therein that the same may conform to the record of the case in the Patent Office.

Signed and sealed this 25th day of June, A. D., 1907.

[SEAL.]

C. C. BILLINGS,
*Acting Commissioner of Patents.* headed pins, also having enlarged openings near one end of said channels respectively; in combination with an outer casing fitting within the rim and provided with headed pins adapted to enter the enlarged openings and slidable in the transverse channels of the rim.

In witness whereof I have hereunto signed my name at Springfield Illinois this 19th day of December, 1906.

JOHN H. GREEN.

Witnesses:
O. A. MERKEL,
W. J. AURELEUS.

Correction in Letters Patent No. 855,884.

It is hereby certified that in Letters Patent No. 855,884, granted June 4, 1907, upon the application of John H. Green, of Springfield, Illinois, for an improvement in "Pneumatic Tires," an error appears in the printed specification requiring correction, as follows: "In line 97, page 1, the reference letter "a³" should be $a^1$; and that the said Letters Patent should be read with this correction therein that the same may conform to the record of the case in the Patent Office.

Signed and sealed this 25th day of June, A. D., 1907.

[SEAL.]

C. C. BILLINGS,
*Acting Commissioner of Patents.*

Correction in Letters Patent No. 855,884.

It is hereby certified that in Letters Patent No. 855,884, granted June 4, 1907, upon the application of John H. Green, of Springfield, Illinois, for an improvement in "Pneumatic Tires," an error appears in the printed specification requiring correction, as follows: "In line 97, page 1, the reference letter "$a^3$" should be $a^1$; and that the said Letters Patent should be read with this correction therein that the same may conform to the record of the case in the Patent Office.

Signed and sealed this 25th day of June, A. D., 1907.

[SEAL.]

C. C. BILLINGS,
*Acting Commissioner of Patents.*